(12) United States Patent
Lius et al.

(10) Patent No.: US 11,900,718 B2
(45) Date of Patent: Feb. 13, 2024

(54) METHOD OF OPERATING A SENSING CIRCUIT TO REDUCE EFFECT OF PARASITIC CAPACITORS BETWEEN SENSING WIRES OF THE SENSING CIRCUIT

(71) Applicant: InnoLux Corporation, Miao-Li County (TW)

(72) Inventors: Chandra Lius, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/985,124

(22) Filed: Nov. 10, 2022

(65) Prior Publication Data

US 2023/0075616 A1  Mar. 9, 2023

Related U.S. Application Data

(63) Continuation of application No. 17/500,887, filed on Oct. 13, 2021, now Pat. No. 11,521,421.

(30) Foreign Application Priority Data

Nov. 16, 2020 (CN) .......................... 202011280567.0

(51) Int. Cl.
*G06V 40/12* (2022.01)

(52) U.S. Cl.
CPC .............................. *G06V 40/1347* (2022.01)

(58) Field of Classification Search
None
See application file for complete search history.

(56) References Cited

U.S. PATENT DOCUMENTS

2009/0283340 A1* 11/2009 Liu ................. H03K 17/9622
                                                       178/18.06
2016/0306489 A1* 10/2016 Mizuhashi .......... G06F 3/04166
2019/0171329 A1*  6/2019 Lv ..................... G06F 3/0412

* cited by examiner

*Primary Examiner* — Nicholas J Lee
(74) *Attorney, Agent, or Firm* — Winston Hsu

(57) ABSTRACT

A sensing circuit has a plurality of sensing units and a plurality of sensing electrodes. The sensing electrodes are divided into a first group and a second group. The sensing electrodes of the first group are electrically connected to a portion of the sensing units, and the sensing electrodes of the second group are electrically connected to another portion of the sensing units. A first sensing signal is provided to the sensing electrodes of the first group in a first time period, and a second sensing signal is provided to the sensing electrodes of the second group in a second time period. The first time period and the second time period start at different times and are not overlapped with each other.

12 Claims, 17 Drawing Sheets

METHOD OF OPERATING A SENSING CIRCUIT TO REDUCE EFFECT OF PARASITIC CAPACITORS BETWEEN SENSING WIRES OF THE SENSING CIRCUIT

CROSS REFERENCE TO RELATED APPLICATIONS

This application is a continuation application of U.S. application Ser. No. 17/500,887, filed on Oct. 13, 2021. The content of the application is incorporated herein by reference.

BACKGROUND OF THE DISCLOSURE

1. Field of the Disclosure

The present disclosure relates to a method of operating a sensing circuit, in particular to a method of operating a sensing circuit to reduce the effect of parasitic capacitors between multiple sensing wires on sensing accuracy.

2. Description of the Prior Art

There are many electronic devices on the market with fingerprint identification function, which is often used for mobile phone user authentication, financial transactions, security needs, etc. How to improve the accuracy of fingerprint identification has always been one of the main issues that manufacturers pay attention to.

SUMMARY OF THE DISCLOSURE

An embodiment of the present disclosure provides a method of operating a sensing circuit. The sensing circuit comprises a plurality of sensing units and a plurality of sensing electrodes. The sensing electrodes are divided into a first group and a second group. The sensing electrodes of the first group are electrically connected to a portion of the sensing units, and the sensing electrodes of the second group are electrically connected to another portion of the sensing units. The method comprises providing a first sensing signal to the sensing electrodes of the first group in a first time period, and providing a second sensing signal to the sensing electrodes of the second group in a second time period. The first time period and the second time period start at different times and are not overlapped with each other.

These and other objectives of the present disclosure will no doubt become obvious to those of ordinary skill in the art after reading the following detailed description of the embodiment that is illustrated in the various figures and drawings.

DETAILED DESCRIPTION

Figure 1:
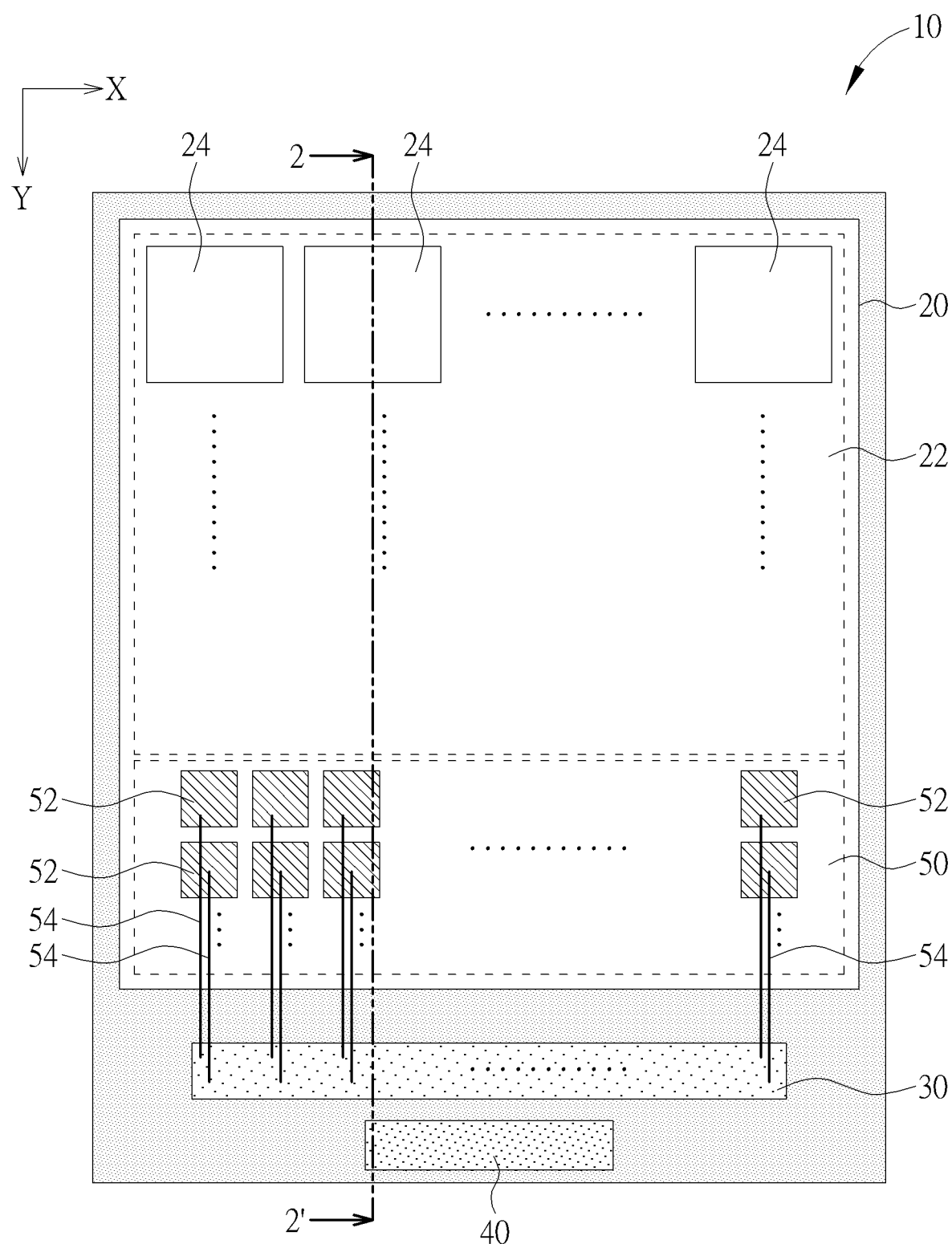
FIG. 1 is a schematic diagram of an electronic device including a sensing circuit according to an embodiment of the disclosure.

The present disclosure may be understood by reference to the following detailed description, taken in conjunction with the drawings as described below, and for purposes of illustrative clarity and being easily understood by the readers, various drawings of this disclosure may be simplified, and the elements in various drawings may not be drawn to scale. In addition, the number and dimension of each element shown in drawings are only illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function. In the following description and in the claims, the terms "comprise", "include" and "have" are used in an open-ended fashion, and thus should be interpreted to mean "include, but not limited to . . . ".

The direction terms used in the following embodiments such as up, down, left, right, in front of or behind are only the directions referring to the attached figures. Thus, the direction terms used in the present disclosure are for illustration, and are not intended to limit the scope of the present disclosure. It should be noted that the elements which are specifically described or labeled may exist in various forms for those skilled in the art. Besides, when a layer is referred to as being "on" another element or layer, or is referred to as being "connected" to another element or layer, it may be directly on or connected to the other element or layer, or intervening layers or elements may be included between the layer and the other element or layer (indirectly). In contrast, when an element or layer is referred to as being "directly on" or "directly connected to" another element or layer, there are no intervening elements or layers present.

The electrical connection may include direct connection or indirect connection. The electrical connection between two components can be achieved by directly contacting in order to transmit electrical signals, and there are no other components between the two components. The electrical connection of two components can also be bridged through the component intermediary between the two components to transmit electrical signals. Electrical connection can also be called as coupling. The coupling of the two elements can be that there is no conductive intermediate element between the two elements, but the two elements may form a capacitor through an intermediate element.

The ordinal numbers such as "first", "second", "third", etc. are used in the specification and claims to modify the elements in the claims. It does not mean that the required element has any previous ordinal number, and it does not represent the order of a required element and another required element or the order in the manufacturing method. The ordinal number is only used to distinguish the required element with a certain name and another required element with the same certain name.

The terms "about", "equal to", "equivalent", "the same", "roughly " or "substantially" generally mean within 20% of a given value or range, or mean within 10%, 5%, 3%, 2%, 1%, or 0.5% of a given value or range.

It should be noted that the technical features in different embodiments described in the following may be replaced, recombined, or mixed with one another to constitute another embodiment without departing from the spirit of the present disclosure.

The electronic device of the present disclosure may include display device, light emitting device, antenna device, sensing device, touch electronic device (touch display), curved electronic device (curved display) or non-rectangular electronic device (free shape display), but not limited thereto. The electronic device may include foldable electronic device or flexible electronic device. The electronic device may for example include light-emitting diode (LED), fluorescence, phosphor, other suitable display medium or combinations thereof, but not limited thereto. For instance, the LED may include organic LED (OLED), mini LED, micro LED or quantum dot LED(QLED or QDLED), other suitable material or any combination thereof, but not limited thereto. The display device of an example may be a tiled display device, but is not limited thereto. The antenna device may for example be a liquid crystal antenna, but not limited thereto. Also, outer shape of the electric device may be rectangular, circular, polygonal, shape with curved edge or other suitable shapes. The electronic device may include peripheral system, such as driving system, control system, light source system, frame system, etc., for supporting the display device or tiled device. It should be noted that the electronic device may be combinations of the above-mentioned electronic devices, but not limited thereto. The electronic device as mentioned herein takes the display device as an example to detail the content of the present disclosure, but the present disclosure is not limited thereto.

Figure 2:
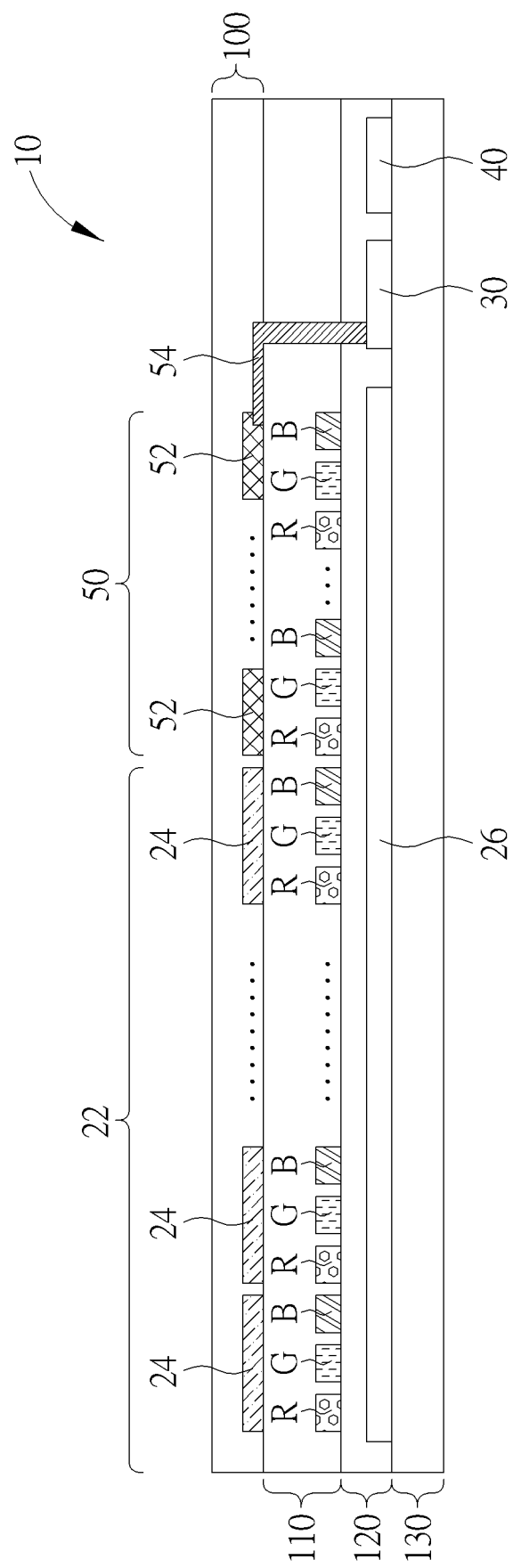
FIG. 2 is a cross-sectional diagram of the electronic device in FIG. 1 along a dashed line 2-2'.

Refer to FIGS. 1 and 2, FIG. 1 is a schematic diagram of the electronic device 10 containing the sensing circuit of an embodiment of the present disclosure, and FIG. 2 is a cross-section of the electronic device 10 of FIG. 1 along the dotted line 2-2'. The sensing circuit disclosed can be used to provide a fingerprint sensing function of an electronic device. However, the present disclosure is not limited to the sensing of fingerprints. For example, the sensing circuit disclosed in this paper can also be applied to electronic devices such as mobile phones, access control systems, security locks, etc. Besides sensing fingerprints, it can also be used as an interface to operate electronic devices by touch control.

Please refer to FIGS. 1 and 2. FIG. 1 is a schematic diagram of an electronic device 10 including a sensing circuit according to an embodiment of the disclosure. FIG. 2 is a cross-sectional diagram of the electronic device 10 in FIG. 1 along a dashed line 2-2'. The sensing circuit of the present disclosure can be used to provide the electronic device 10 with a fingerprint sensing function. However, this disclosure is not limited to being used to sense fingerprints. For example, the sensing circuit of the present disclosure can also be applied to electronic devices such as mobile phones, access control systems, and security locks. In addition to sensing fingerprints, it can also be used as an interface for operating electronic devices in a touch mode.

In this embodiment, the electronic device 10 comprises a display panel 20, a sensing unit set 30 and a sensor integrated circuit (sensor IC) 40. The display panel 20 is used to display a picture, and comprises a plurality of pixels, and each pixel may comprise a red sub-pixel R, a green sub-pixel G, and a blue sub-pixel B arranged in a display layer 110. Please refer to FIG. 2, the electronic device 10 may comprise a substrate 130, a circuit layer 120, the display layer 110 and a sensing layer 100. The substrate 130 may comprise a rigid substrate, a flexible substrate, a flexible substrate, or a non-flexible substrate, and its material may comprise, for example, glass, quartz, wafer, sapphire substrate, polycarbonate (PC), polyimide (PI), polypropylene (PP), polyethylene terephthalate (PET), other suitable materials or a combination of the above materials. The circuit layer 120 can be disposed on the substrate 130. In addition, the electronic device 10 further comprises a thin film transistor circuit 26. The thin film transistor circuit 26 can be disposed in the circuit layer 120 to drive the red sub-pixels R, the green sub-pixels G, and the blue sub-pixels B. The sensing unit set 30 and the sensor integrated circuit 40 can also be arranged in the circuit layer 120. The display layer 110 can be disposed on the circuit layer 120, the pixels (including the red sub-pixels R, the green sub-pixels G, and the blue sub-pixels B) can be disposed in the display layer 110, and the sensing layer 100 can be disposed on the display layer 110. The sensing layer 100 may comprise a first sensing area 22 and a second sensing area 50. The first sensing area 22 may comprise sensing electrodes 24, and the second sensing area 50 may comprise sensing electrodes 52. The sensing signal can be transmitted from the sensing layer 100 to the circuit layer 120 through the sensing wires 54. For example, the sensing wires 54 may be electrically connected to the sensing electrodes 52 and the sensing unit set 30 to transmit the sensing signals to the sensing unit set 30. The sensing layer 100 may sense a user's touch and control the operations of the electronic device 10 according to the user's touch. The first sensing area 22 can have a touch function and can operate through self-induction, mutual inductance, or other suitable touch sensing. The second sensing area 50 may have touch and/or fingerprint recognition functions. For example, the second sensing area 50 can perform fingerprint recognition through self-induction touch sensing operations and/or through sensing changes in capacitance, but is not limited thereto. In addition, the sensing electrode 52 of the sensing circuit of the present disclosure is disposed in the second sensing area 50. When the user's finger presses the second sensing area 50, the sensing circuit of the present disclosure can sense the user's fingerprint. In addition, the first sensing area 22 is provided with a plurality of sensing electrodes 24 for generating corresponding signals in response to the user's touch on the display panel 20, and then controlling the operations of the electronic device 10 according to the user's touch.

Figure 3:
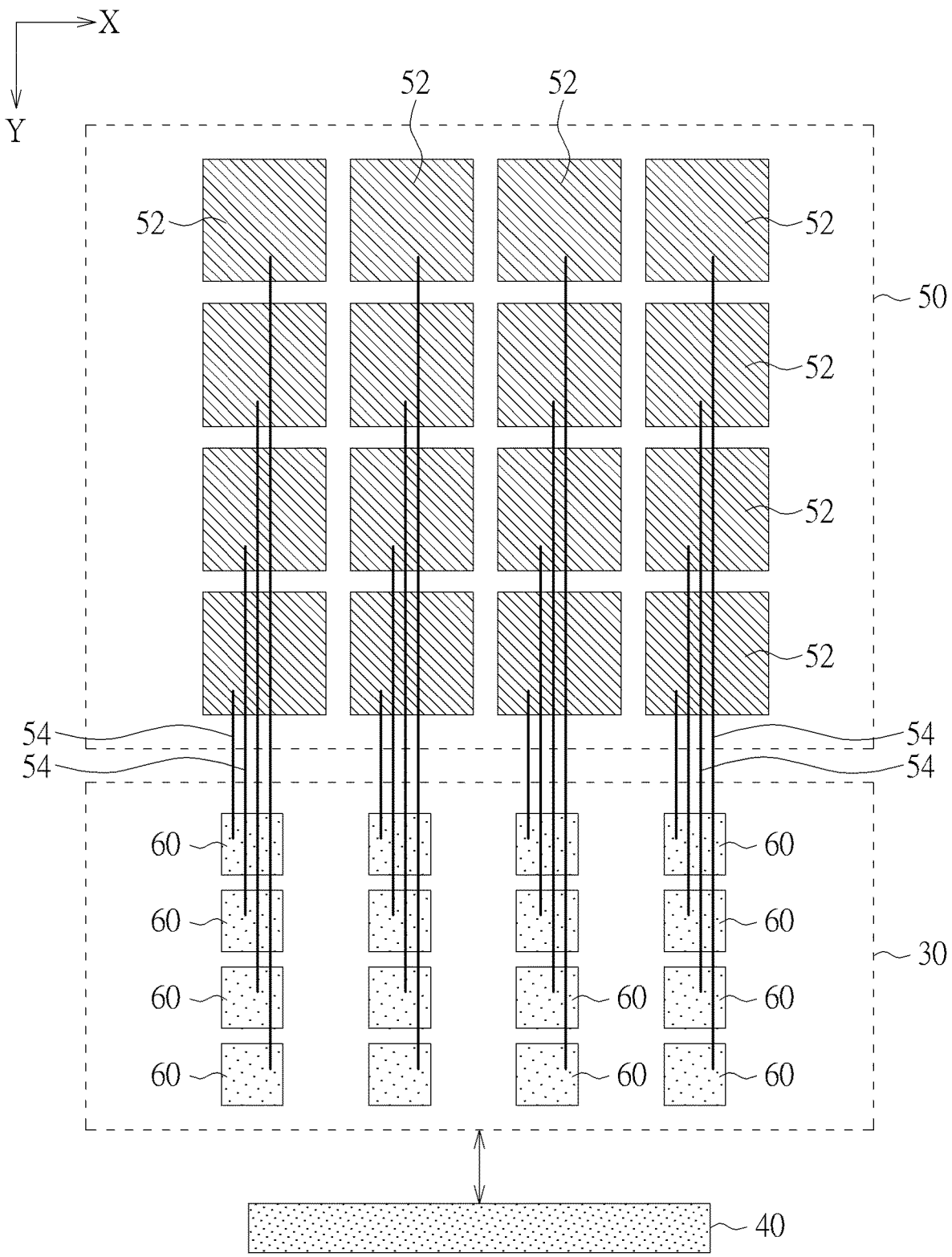
FIG. 3 is a schematic diagram of a second sensing area and a set of sensing units in FIG. 1.

Please refer to FIG. 3, which is a schematic diagram of the second sensing area 50 and the sensing unit set 30 in FIG. 1. The second sensing area 50 comprises a plurality of sensing electrodes 52, and the sensing electrodes 52 may be made of conductive materials such as indium tin oxide (ITO) or metal. The sensing unit set 30 comprises a plurality of sensing units 60. Each sensing electrode 52 is connected to a corresponding sensing unit 60 through a corresponding sensing wire 54. As shown in FIG. 3, the plurality of sensing electrodes 52 and the plurality of sensing units 60 are arranged in arrays along an X direction and a Y direction, and the sensing wire 54 may be substantially in parallel to the Y direction. The X direction may be a direction different from the Y direction. For example, the X direction may be substantially perpendicular to the Y direction. When the user's finger presses on the second sensing area 50, the capacitance between each sensing electrode 52 and the user's finger will vary depending on the ridge or valley of the fingerprint corresponding to the sensing electrode 52, and the sensing units 60 would output corresponding signals to the sensor integrated circuit 40 according to the different capacitances between the sensing electrodes 52 and the finger. Therefore, the sensor integrated circuit 40 would determine the user's fingerprint based on the signals output by the sensing units 60.

Figure 4:
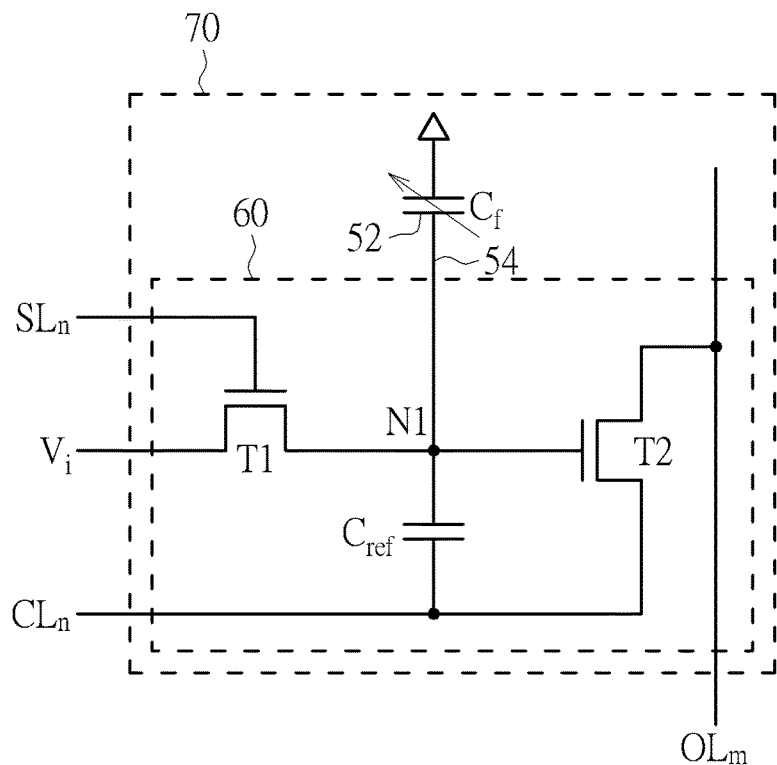
FIG. 4 is a circuit diagram of a sensing module composed of a sensing electrode and a sensing unit in FIG. 3.

Please refer to FIG. 4, which is a circuit diagram of a sensing module 70 composed of a sensing electrode 52 and a sensing unit 60 in FIG. 3. As described above, the sensing electrode 52 is disposed in the second sensing area 50, the sensing unit 60 is disposed in the sensing unit set 30, and the sensing electrode 52 is electrically connected to the sensing unit 60 through a corresponding sensing wire 54. When the user's finger touches the second sensing area 50, the capacitance of the sensing capacitor $C_f$ formed between the sensing electrode 52 and the user's finger will change accordingly. The sensing unit 60 comprises transistors T1 and T2 and a reference capacitor $C_{ref}$. The transistor T1 serves as a reset transistor for controlling the voltage level of the node N1. The gate of the transistor T1 is electrically connected to the scan signal line $SL_n$, one of the source and the drain of the transistor T1 is electrically connected to the reference signal line $V_i$, and the other one of the source and the drain of the transistor T1 is electrically connected to node N1. One end of the reference capacitor $C_{ref}$ is electrically connected to the node N1, and the other end of the sensing capacitor $C_{ref}$ is electrically connected to the control signal line $CL_n$. In an embodiment of the disclosure, the control signal line $CL_n$ may be the next scan signal line $SL_{n+1}$. Where, n is a positive integer, $SL_n$ represents the $n^{th}$ scan signal line, and $SL_{n+1}$ represents the $(n+1)^{th}$ scan signal line. The electronic device 10 sequentially controls the plurality of sensing units 60 through the scan signal lines including $SL_n$ and $SL_{n+1}$. The transistor T2 is used as a signal-reading transistor. The gate of the transistor T2 is electrically connected to node N1, one of the source and drain of the transistor T2 is electrically connected to the control signal line $CL_n$, and the other one of the source and drain of the transistor T2 is electrically connected to the signal output line $OL_m$. The signal output line $OL_m$ is electrically connected to the sensor integrated circuit 40 for outputting the signal generated by the sensing unit 60 due to the sensing of the sensing capacitor $C_f$ to the sensor integrated circuit 40.

Figure 5:
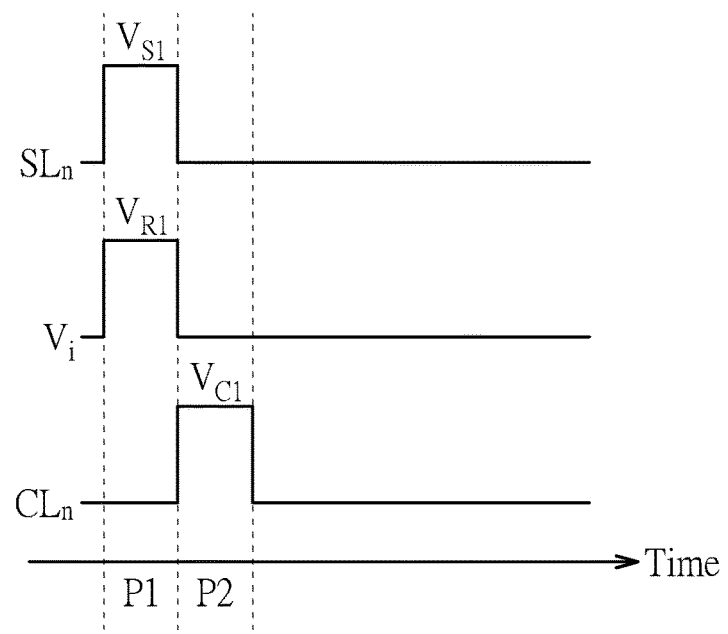
FIG. 5 is a timing diagram of signals of a scan signal line, a reference signal line, and a control signal line in FIG. 4.

Please refer to FIGS. 4 and 5. FIG. 5 is a timing diagram of signals of the scan signal line $SL_n$, the reference signal line $V_i$, and the control signal line $CL_n$ in FIG. 4. In a period P1, the scan signal line $SL_n$ and the reference signal line $V_i$ are provided with a scan signal $V_{S1}$ and a reference signal $V_{R1}$, respectively. The transistor T1 is turned on because its gate receives the scan signal $V_{S1}$, so that the reference signal $V_{R1}$ is transmitted to the node N1. When a finger approaches the sensing electrode 52, the sensing capacitor $C_f$ would have a different capacitance according to whether the sensing electrode 52 corresponds to a ridge or a valley of the fingerprint. In a period P2, the scan signal $V_{S1}$ is no longer transmitted to the gate of the transistor T1 of the sensing unit 60, so that the transistor T1 of the sensing unit 60 is turned off. At this time, a sensing signal $V_{C1}$ is transmitted to an end of the reference capacitor $C_{ref}$ and the transistor T2 through the control signal line $CL_n$. Meanwhile, the voltage level of the node N1 changes according to the capacitance of the sensing capacitor $C_f$, the capacitance of the reference capacitor $C_{ref}$, and the amplitude of the sensing signal $V_{C1}$. The change in the voltage level of the node N1 is reflected in a current of the signal output line $OL_m$. Since the capacitance of the reference capacitor $C_{ref}$ is fixed, the capacitance of the sensing capacitor $C_f$ can be determined according to the current of the signal output line $OL_m$, and whether the sensing electrode 52 is corresponding to a ridge or a valley of the fingerprint can be determined according to the capacitance of the sensing capacitor $C_f$.

Figure 6:
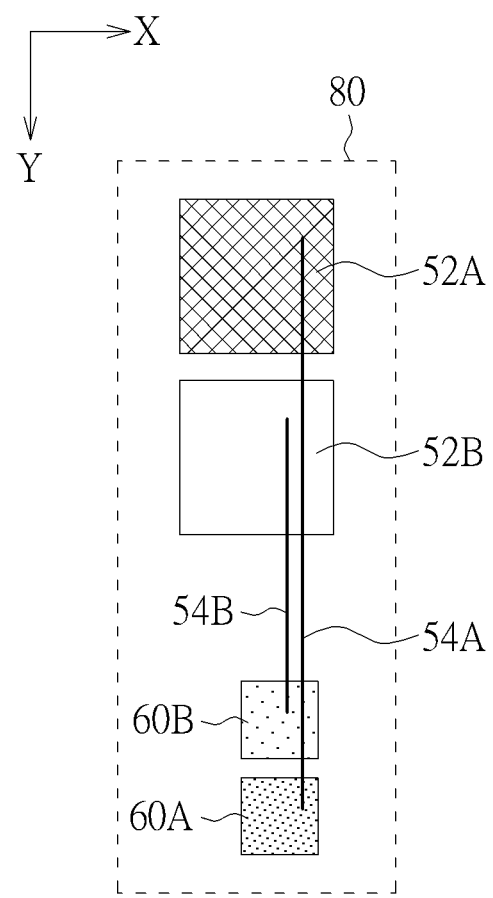
FIG. 6 is a schematic diagram of a sensing circuit according to an embodiment of the disclosure.
Figure 7:
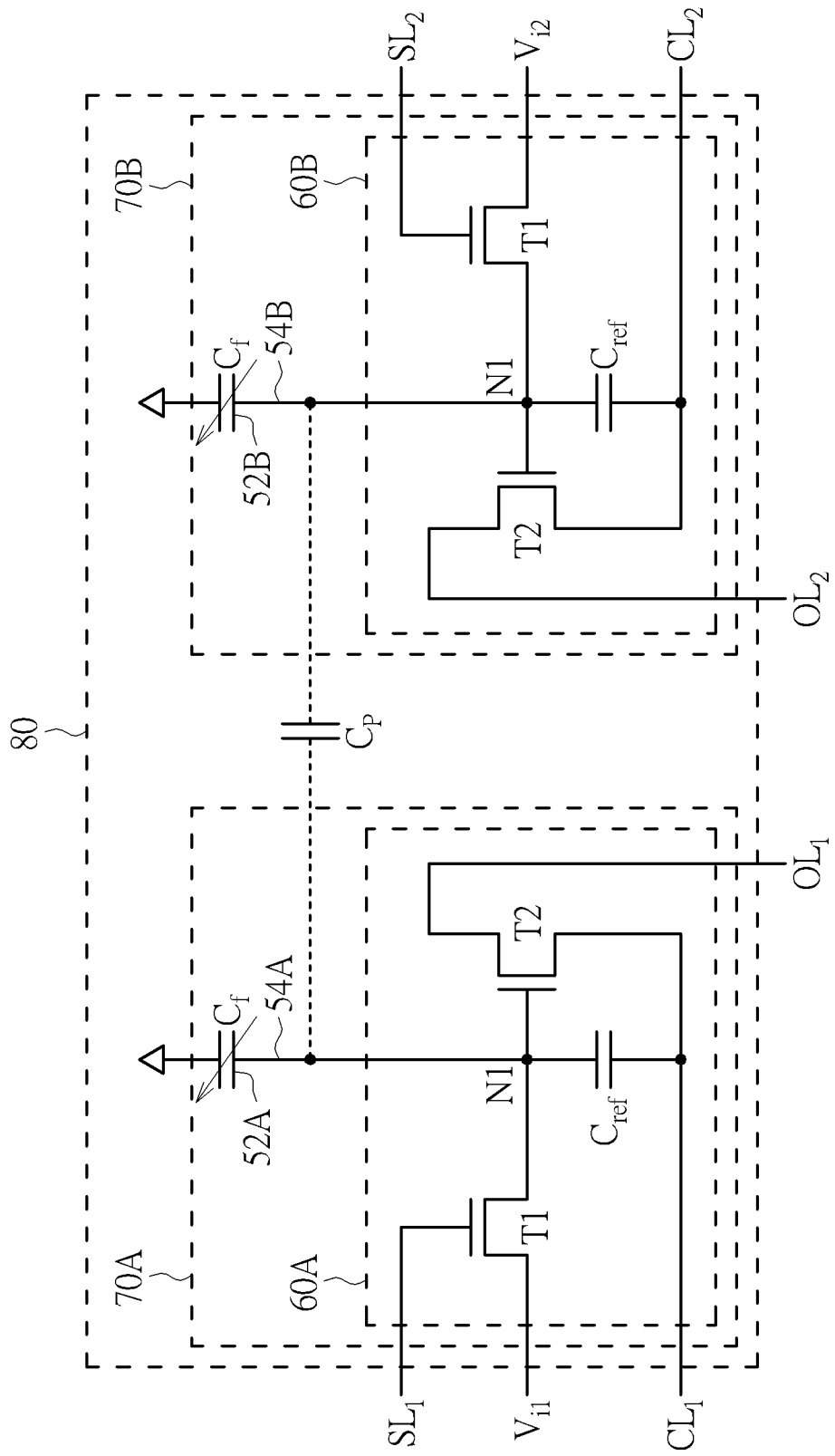
FIG. 7 is a circuit diagram of the sensing circuit of FIG. 6.

Please refer to FIGS. 6 and 7. FIG. 6 is a schematic diagram of the sensing circuit 80 according to an embodiment of the disclosure, and FIG. 7 is a circuit diagram of the sensing circuit 80 of FIG. 6. The sensing circuit 80 comprises at least two sensing electrodes 52A and 52B, at least two sensing wires 54A and 54B, and at least two sensing units 60A and 60B. The sensing electrodes 52A and 52B are two sensing electrodes of the plurality of sensing electrodes 52 in FIG. 3, the sensing wires 54A and 54B are two sensing wires of the plurality of sensing wires 54 in FIG. 3, and the sensing unit 60A And 60B are two sensing units of the plurality of sensing units 60 in FIG. 3. The circuit structures of the sensing units 60A and 60B are the same as the sensing unit 60 in FIG. 4, and will not be repeated here. The reference capacitor $C_{ref}$ of the sensing unit 60A is electrically connected to the sensing electrode 52A through the sensing wire 54A, and the reference capacitor $C_{ref}$ of the sensing unit 60B is electrically connected to the sensing electrode 52B through the sensing wire 54B. Since the sensing wire 54A and the sensing wire 54B are very close, a parasitic capacitor $C_p$ is formed between the sensing wire 54A and the sensing wire 54B, and the sensing wire 54A and the sensing wire 54B can be regarded as being coupled to each other through the parasitic capacitor $C_p$. More specifically, when looking down on the display panel 20 as shown in FIG. 1, if it is observed that the two sensing wires 54A and 54B overlap at least partially, or although they do not overlap each other, a minimum distance between the two sensing wires 54A and 54B is less than 2 micrometers (i.e., 2 um), it can be regarded that the two sensing wires 54A and 54B are coupled to each other through the parasitic capacitor $C_p$. In addition, the sensing unit 60A and the sensing electrode 52A constitute a sensing module 70A, the sensing unit 60B and the sensing electrode 52B constitute another sensing module 70B, and the sensing electrode 52A and the sensing electrode 52B are each connected to the user's finger to form a sensing capacitor $C_f$. In the present disclosure, the method of measuring the minimum distance between the two sensing wires or whether the two sensing wires at least partially overlap can be measured or observed by using an optical microscope, but the present disclosure is not limited thereto.

Figure 8:
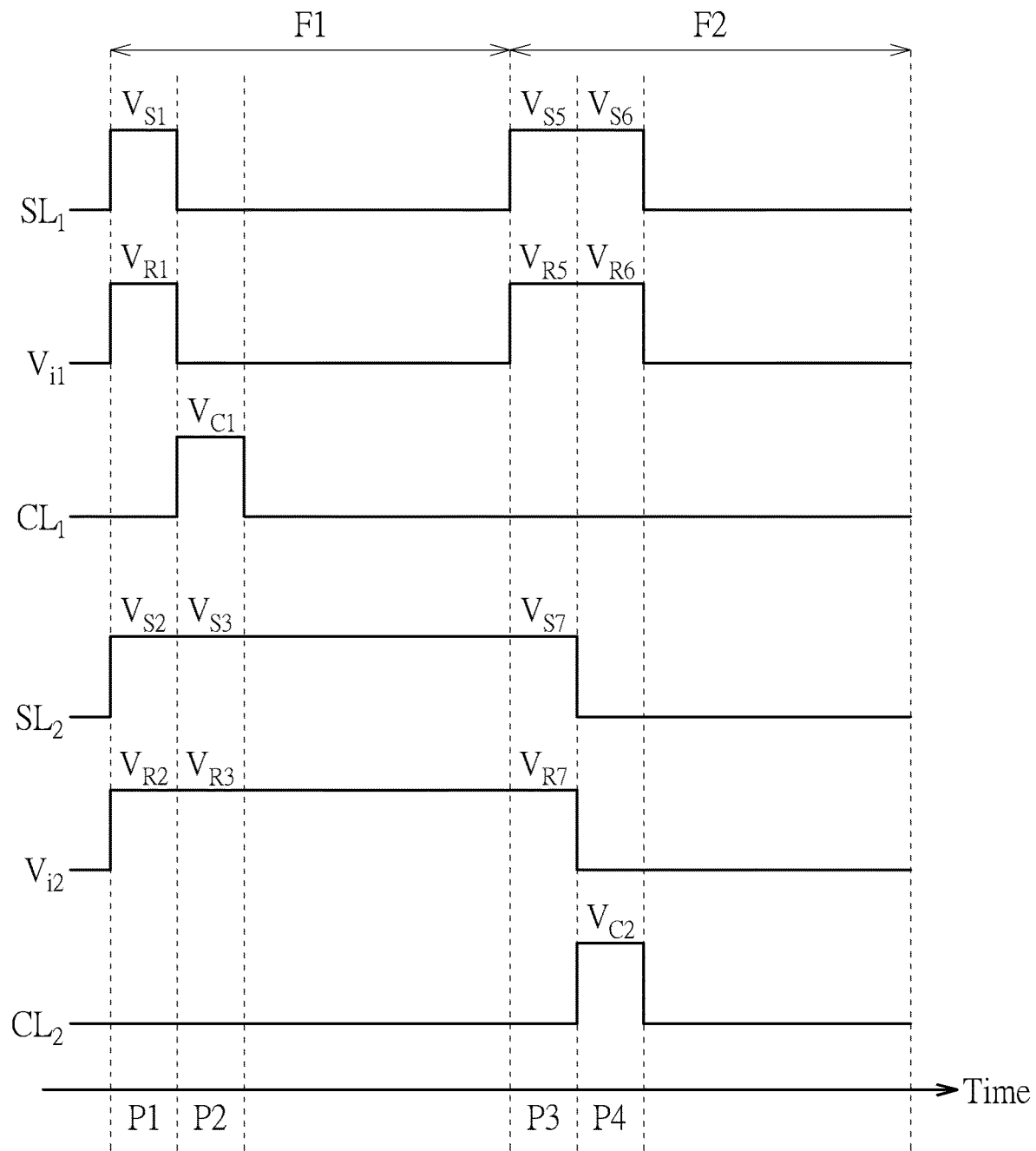
FIG. 8 is a timing diagram of signals of two scan signal lines, two reference signal lines, and two control signal lines in FIG. 7.

Please refer to FIGS. 7 and 8. FIG. 8 is a timing diagram of signals of two scan signal lines $SL_1$ and $SL_2$, the two reference signal lines $V_{i1}$ and $V_{i2}$, and two control signal lines $CL_1$ and $CL_2$ of FIG. 7. FIG. 8 shows a timing diagram of the signals within two frames F1 and F2 of the electronic device 10. During the period of the frame F1, the sensing capacitor $C_f$ in the sensing module 70A is sensed, but the sensing capacitor $C_f$ in the sensing module 70B is not sensed. During the period of the frame F2, the sensing capacitor $C_f$ in the sensing module 70B is sensed, but the sensing capacitor $C_f$ in the sensing module 70A is not sensed. In the period P1 of the frame F1, a scan signal $V_{S1}$, the reference signal $V_{R1}$ a scan signal $V_{S2}$, and a reference signal $V_{R2}$ are respectively provided to the scan signal line $SL_1$, the reference signal line $V_{i1}$, the scan signal line $SL_2$, and the reference signal line $V_{i2}$. The transistors T1 of the sensing units 60A and 60B are turned on because their gates receive the scan signals VS1 and VS2, so that the reference signals $V_{R1}$ and $V_{R2}$ are transmitted to the nodes N1 of the sensing units 60A and 60B. In this embodiment, since the reference signals $V_{R1}$ and $V_{R2}$ have the same amplitude (i.e., the voltage levels thereof are equal), there will be no voltage difference between the two ends of the parasitic capacitor $C_p$, and the influence of the parasitic capacitance $C_p$ on the accuracy of sensing the sensing capacitance $C_f$ of the sensing module 70A would be reduced.

It should be noted that the two signals (e.g., the reference signals $V_{R1}$ and $V_{R2}$) have the "same amplitude (voltage level)", it can be regarded as the reference signals $V_{R1}$ and $V_{R2}$ have the same voltage amplitude while a glitch caused by noise is not considered, and the voltages of the two signals could be measured with an oscilloscope.

In the period P2 of the frame F1, the scan signal $V_{S1}$ is no longer transmitted to the gate of the transistor T1 of the sensing unit 60A, so that the transistor T1 of the sensing unit 60A is turned off. In addition, the sensing signal $V_{C1}$ passes through the control signal line $CL_1$ to one end of the reference capacitor $C_{ref}$ and the transistor T2, and a scan signal $V_{S3}$ and a reference signal $V_{R3}$ are respectively transmitted to the scan signal line $SL_2$ and the reference signal line $V_{i2}$. At this time, the voltage level of the node N1 of the sensing unit 60B will be equal to the voltage level of the reference signal $V_{R3}$. Since the voltage level of the reference signal $V_{R3}$ is equal to the voltage level of the reference signal $V_{R2}$, the voltage level of the node N1 of the sensing unit 60B is the same in the periods P1 and P2. The voltage level of the node N1 of the sensing unit 60A changes according to the capacitance of the sensing capacitor $C_f$, the capacitance of the reference capacitor $C_{ref}$, and the amplitude of the sensing signal $V_{C1}$, thereby affecting the current output to the signal output line $OL_1$. Although the voltage level of the node N1 of the sensing unit 60A will be affected by the parasitic capacitor $C_p$, because the voltage level of the node N1 of the sensing unit 60B in the period P2 and the capacitance of the reference capacitors $C_{ref}$ of the two sensing units 60A and 60B in the period P2 are known, the degree of influence of the parasitic capacitor $C_p$ on the voltage level of the node N1 of the sensing unit 60A can be calculated. According to the calculated degree of influence, the expected voltage level of the node N1 of the sensing unit 60A when the node N1 is not affected by the parasitic capacitance $C_p$ can be deduced. It is worth noting that during the period of the frame F1, since the sensing capacitor $C_f$ in the sensing module 70B is not sensed, the control signal line $CL_2$ will not be applied with other signals at this time. In addition, in this embodiment, the reference signals $V_{R1}$ and $V_{R3}$ may have the same amplitude (i.e., the same voltage level).

Similarly, in the period P3 of the frame F2, a scan signal $V_{S5}$, a reference signal $V_{R5}$, a scan signal $V_{S7}$, and a reference signal $V_{R7}$ are respectively provided to the scan signal line $SL_1$, the reference signal line $V_{i1}$, the scan signal line $SL_2$, and the reference signal line $V_{i2}$. The transistors T1 of the sensing units 60A and 60B are turned on because their gates receive the scan signals $V_{S5}$ and $V_{S7}$, respectively, so that the reference signals $V_{R5}$ and $V_{R7}$ are transmitted to the nodes N1 of the sensing units 60A and 60B, respectively. In this embodiment, the reference signals $V_{R5}$ and $V_{R7}$ have the same amplitude (i.e., the voltage levels thereof are equal).

In the period P4 of the frame F2, the scan signal $V_{S7}$ is no longer transmitted to the gate of the transistor T1 of the sensing unit 60B, so that the transistor T1 of the sensing unit 60B is turned off. In addition, a sensing signal $V_{C2}$ passes through the control signal line $CL_2$ to be transmitted to an end of the reference capacitor $C_{ref}$ and the transistor T2. A scan signal $V_{S6}$ and the reference signal $V_{R6}$ are respectively transmitted to the scan signal line $SL_1$ and the reference signal line $V_{i1}$. At this time, the voltage level of the node N1 of the sensing unit 60A is be equal to the voltage level of the reference signal $V_{R6}$. Since the voltage level of the reference signal $V_{R6}$ is equal to the voltage level of the reference signal $V_{R5}$, the node N1 of the sensing unit 60A has the same voltage level in the periods P3 and P4. The voltage level of the node N1 of the sensing unit 60B changes according to the capacitance of the sensing capacitor $C_f$, the capacitance of the reference capacitor $C_{ref}$, and the amplitude of the sensing signal $V_{C2}$, thereby affecting the current output to the signal output line $OL_2$. Although the voltage level of the node N1 of the sensing unit 60B will be affected by the parasitic capacitor $C_p$, because the voltage level of the node N1 of the sensing unit 60A in the period P4 is fixed and the capacitance of the reference capacitors $C_{ref}$ of the two sensing units 60A and 60B in the period P4 are known, the degree of influence of the parasitic capacitor $C_p$ on the voltage level of the node N1 of the sensing unit 60B can be calculated. According to the calculated degree of influence, the expected voltage level of the node N1 of the sensing unit 60B when the node N1 is not affected by the parasitic capacitance $C_p$ can be deduced. It is worth noting that during the period of the frame F2, since the sensing capacitor $C_f$ in the sensing module 70A is not sensed, the control signal line $CL_1$ will not be applied with other signals at this time.

Figure 9:
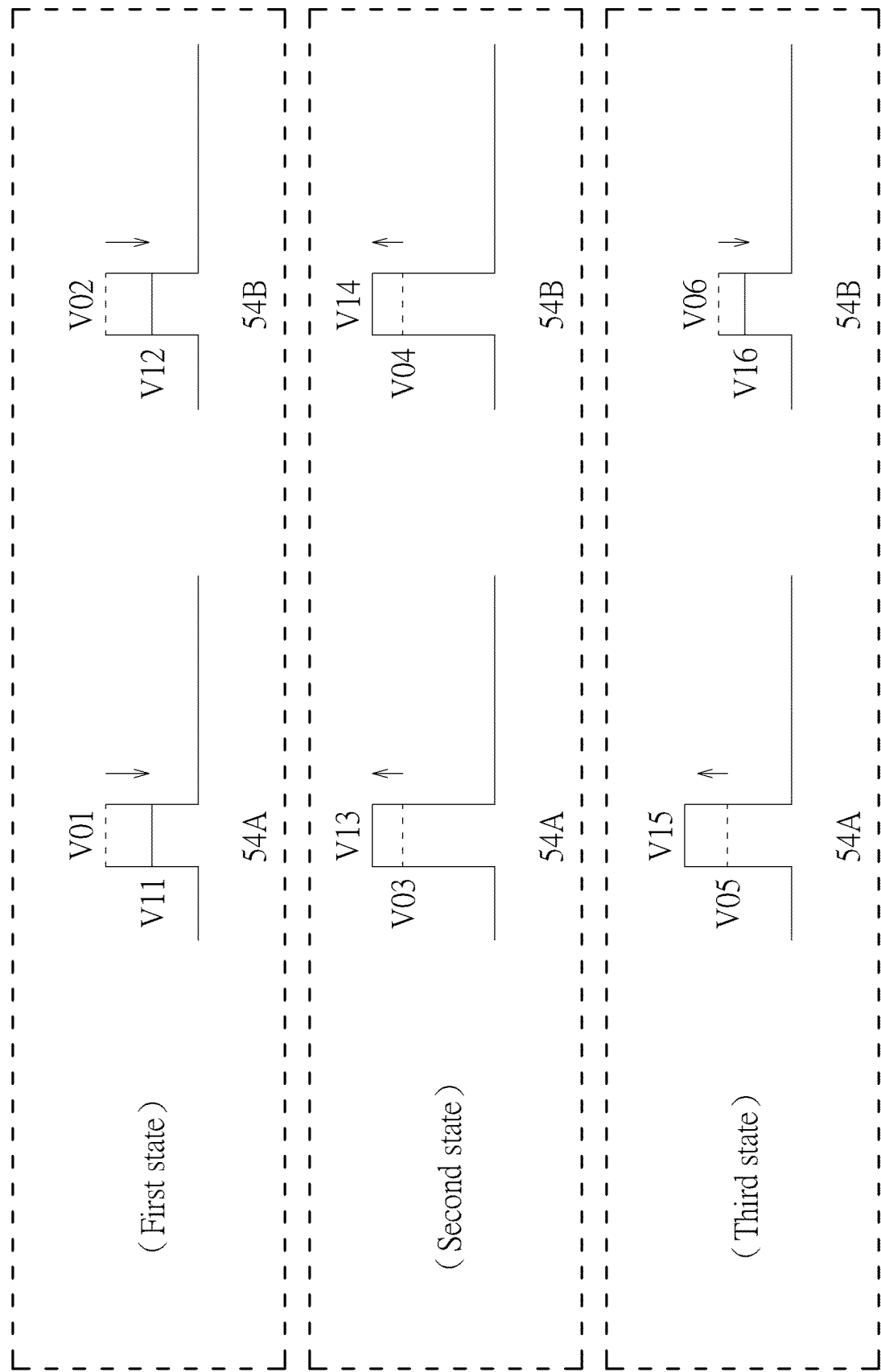
FIG. 9 illustrates changes of the voltage levels of two adjacent signal output lines in different states according to an embodiment of the disclosure.

FIG. 9 illustrates changes of the voltage levels of two adjacent sensing wires 54A and 54B in different states according to an embodiment of the present disclosure. In the first state illustrated in FIG. 9, when the positions of the user's finger corresponding to the sensing electrodes 52, which are electrically connected to the sensing wires 54A and 54B, are both ridges of the fingerprint, the voltage levels of the sensing wires 54A and 54B will drop from the expected voltage levels V01 and V02 to the actual voltage levels V11 and V12, respectively due to the existence of the parasitic capacitor $C_p$. In the second state illustrated in FIG. 9, when the positions of the user's finger corresponding to the sensing electrodes 52, which are electrically connected to the sensing wires 54A and 54B, are both valleys of the fingerprint, the voltage levels of the sensing wires 54A and 54B will rise from the expected voltage levels V03 and V04 to the actual voltage levels V13 and V14, respectively due to the existence of the parasitic capacitor $C_p$.

In the third state illustrated in FIG. 9, when the positions of the user's finger corresponding to the sensing electrodes 52, which are electrically connected to the sensing wires 54A and 54B, are a ridge and a valley of the fingerprint, the voltage levels of the sensing wires 54A and 54B will change from the expected voltage levels V05 and V06 to the actual voltage levels V15 and V16, respectively due to the existence of the parasitic capacitor $C_p$. The expected voltage levels V01, V02, V03, V04, V05, and V06 represent the expected ideal voltage levels of the sensing wires 54A, 54B without the influence of the parasitic capacitor $C_p$. The actual voltage levels V11, V12, V13, V14, V15, and V16 represent the actual voltage levels of the sensing wires 54A and 54B under the influence of the parasitic capacitor $C_p$. Although the actual voltage levels V11, V12, V13, V14, V15, and V16 are different from the expected voltage levels V01, V02, V03, V04, V05, and V06, respectively, the influence of parasitic capacitance $C_p$ on the potential of sensing wires 54A and 54B can be accurately estimated, and the expected voltage levels V01, V02, V03, V04, V05, and V06 would be obtained. Accordingly, it can be determined that the position of the user's finger corresponding to the sensing electrode 52 coupled to the sensing wire (e.g., 54A or 54B) is the ridge or valley of the fingerprint.

Figure 10:
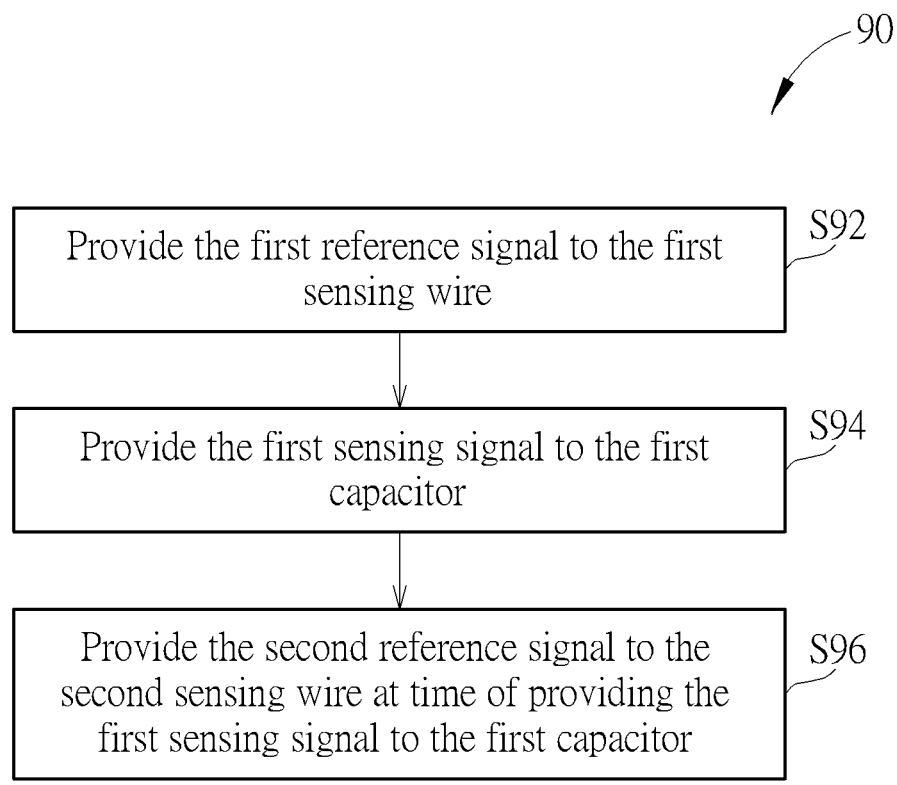
FIG. 10 is a flowchart of a method of operating the sensing circuit according to an embodiment of the disclosure.

Please refer to FIG. 10, which is a flowchart of a method 90 of operating the sensing circuit according to an embodiment of the disclosure. The method 90 comprises the following steps:

Step S92: Providing a first reference signal (e.g., the reference signal $V_{R1}$ in FIG. 8) to the first sensing wire (e.g., the sensing wire 54A in FIG. 7);

Step S94: Providing a first sensing signal (e.g., the sensing signal $V_{C1}$ in FIG. 8) to the first capacitor (e.g., the reference capacitor $C_{ref}$ of the sensing unit 60A in FIG. 7); and Step S96: During the period (e.g., the period P2 in FIG. 8) of providing the first sensing signal (e.g., the sensing signal $V_{C1}$ in FIG. 8) to the first capacitor (e.g., the reference capacitor $C_{ref}$ of the sensing unit 60A in FIG. 7), providing the second reference signal (e.g., the reference signal $V_{R3}$ in FIG. 8) to the second sensing wire (e.g., the sensing wire 54B in FIG. 7).

Figure 11:
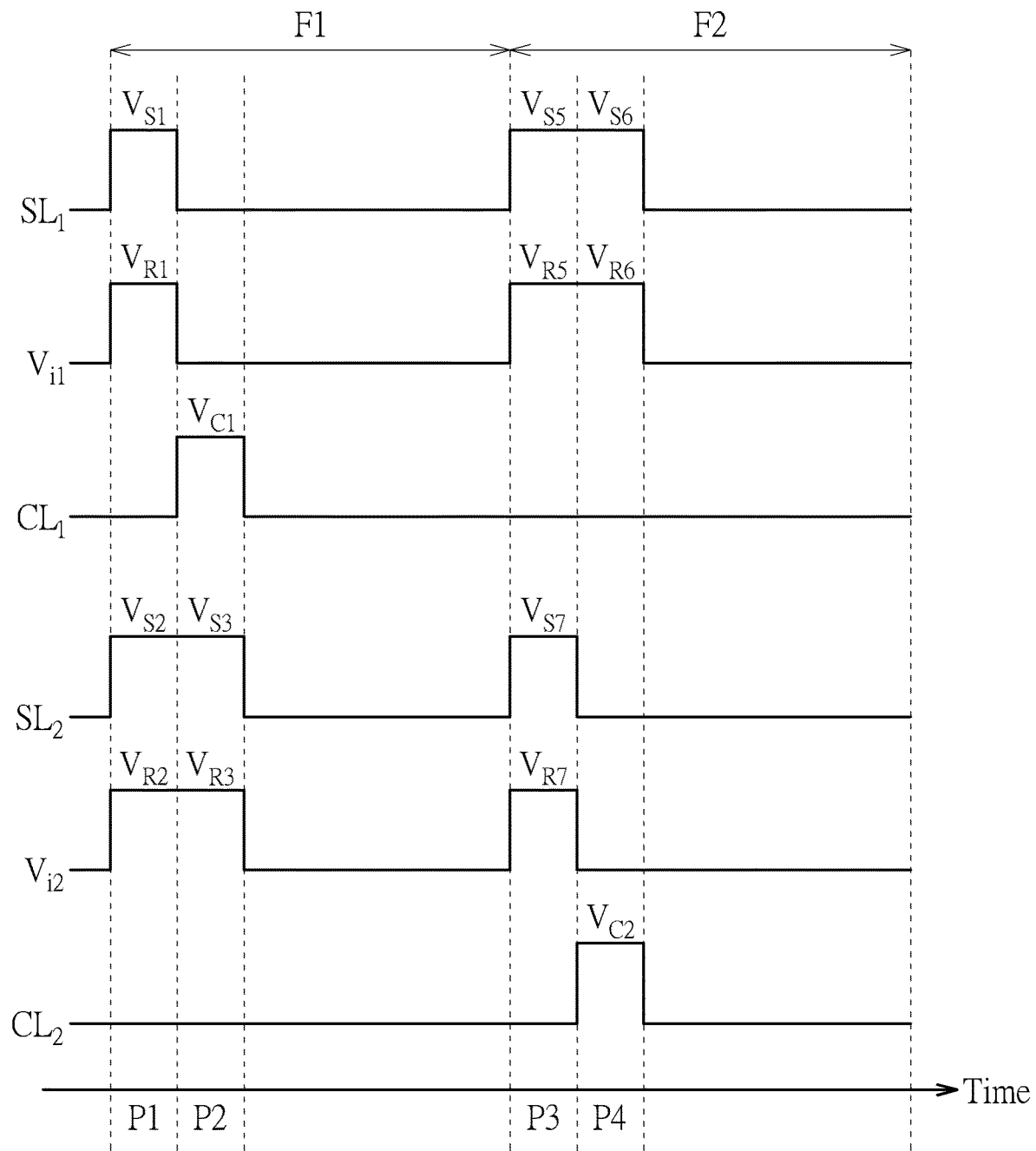
FIG. 11 is a timing diagram of signals of the two scan signal lines, two reference signal lines, and two control signal lines of FIG. 7 in another embodiment.

Please refer to FIG. 11, which is a timing diagram of signals of the two scan signal lines $SL_1$ and $SL_2$, the two reference signal lines $V_{i1}$ and $V_{i2}$, and the two control signal lines $CL_1$ and $CL_2$ of FIG. 7 in another embodiment. The timing diagram of FIG. 11 is very similar to the timing diagram of FIG. 8. The difference between the two timing diagrams is that the voltage levels of the scan signal line $SL_2$ and the reference signal line $V_{i2}$ during a period between the two periods P2 and P3 are different. In the timing diagram of FIG. 8, the voltage levels of the scan signal line $SL_2$ and the reference signal line $V_{i2}$ during the period between the periods P2 and P3 are maintained at a high voltage level. In the timing diagram of FIG. 11, the voltage levels of the scan signal line $SL_2$ and the reference signal line $V_{i2}$ during the period between the periods P2 and P3 are maintained at a low voltage level. Since during the periods P1, P2, P3, and P4 of FIG. 11, the signals provided to the scan signal line $SL_1$, the reference signal line $V_{i1}$, the scan signal line $SL_2$, and the reference signal line $V_{i2}$ are consistent with the signals shown in FIG. 8, the operations of the sensing modules 70A and 70B according to the timing diagram of FIG. 11 would be the same as those of the sensing modules 70A and 70B according to the timing diagram of FIG. 8. Therefore, the operations would not be repeated here.

Figure 12:
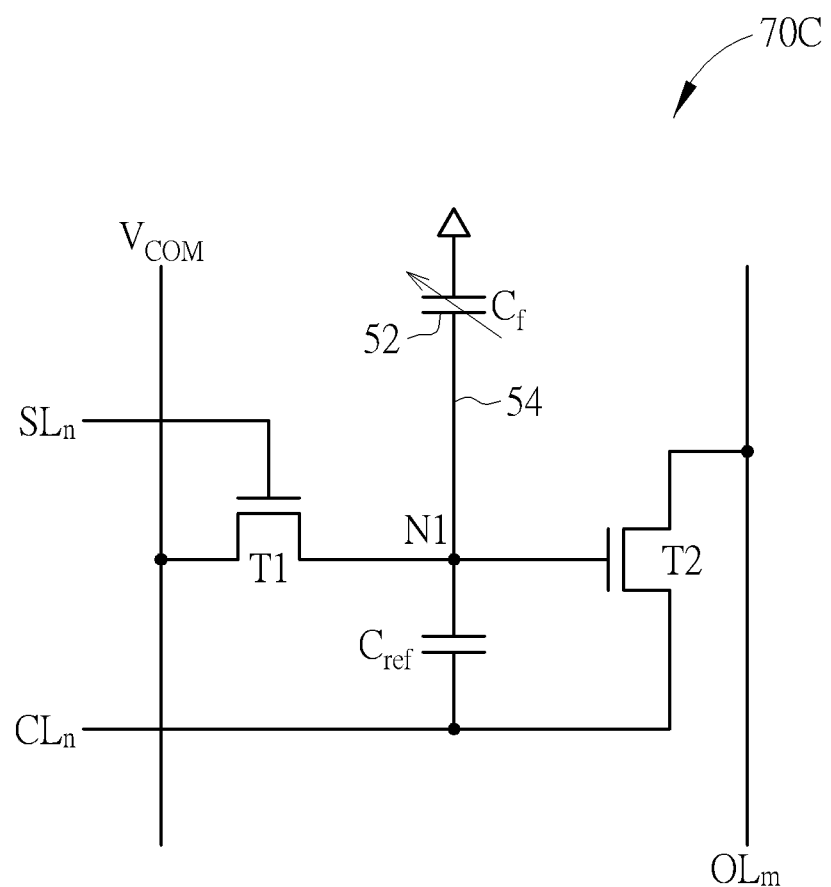
FIG. 12 is a circuit diagram of a sensing module according to another embodiment of the disclosure.

In an embodiment of the present disclosure, the above-mentioned reference signal line $V_i$ may be electrically connected to a common voltage terminal $V_{COM}$. Please refer to FIG. 12, which is a circuit diagram of a sensing module 70C according to another embodiment of the disclosure. The difference between the sensing module 70C and the sensing module 70 in FIG. 4 is that the transistor T1 of the sensing module 70 in FIG. 4 is electrically connected to the reference signal line $V_i$, while the transistor T1 of the sensing module 70C in FIG. 12 is electrically connected to the common voltage terminal $V_{COM}$. The common voltage terminal $V_{COM}$ may provide a common voltage to the sensing module 70C at the same time.

Figure 13:
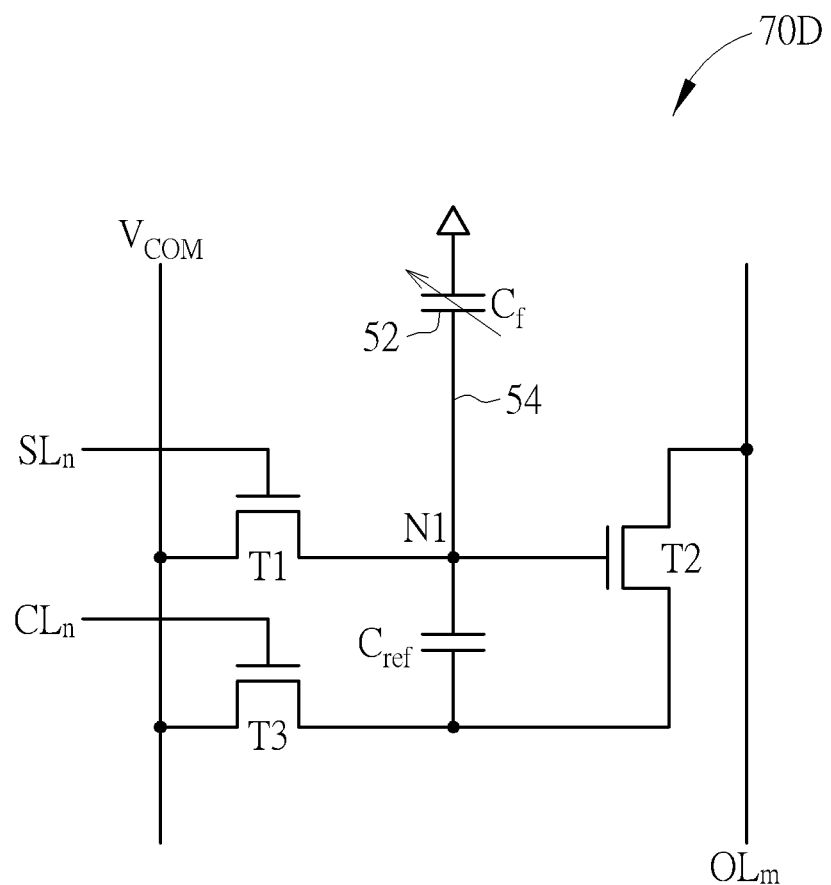
FIG. 13 is a circuit diagram of a sensing module according to another embodiment of the disclosure.

Please refer to FIG. 13, which is a circuit diagram of a sensing module 70D according to another embodiment of the disclosure. The sensing module 70D is similar to the sensing module 70C in FIG. 12, and the difference between the two sensing modules 70C and 70D is: the sensing module 70D in FIG. 13 further comprises a transistor T3, the gate of which is electrically connected to the control signal line $CL_n$, and one of the source and the drain of the transistor T3 is electrically connected to the common voltage terminal $V_{COM}$, and the other one of the source and the drain of the transistor T3 is electrically connected to the transistor T2. The transistor T3 changes its conduction state according to the signal transmitted through the control signal line $CL_n$ to control the electrical connection between the common voltage terminal $V_{COM}$ and the transistor T2. Therefore, the timing of the signals used to control the sensing module 70D would be consistent with the timing of the signals used to control the sensing module 70C described above. Therefore, the operations would not be repeated here.

Figure 14:
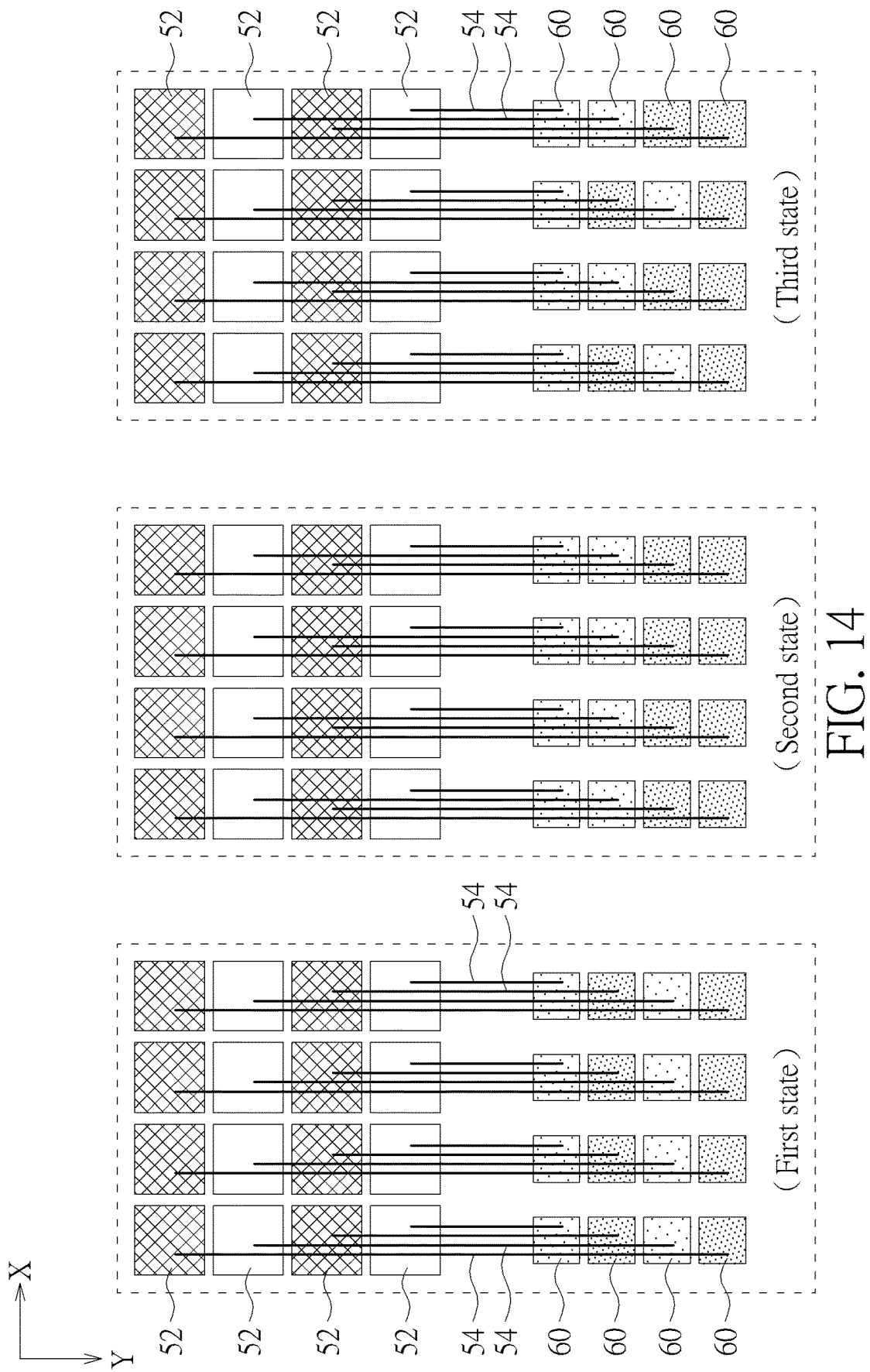
FIG. 14 illustrates several states of driving the sensing circuit of the present disclosure.

Please refer to FIG. 14. FIG. 14 illustrates several states of driving the sensing circuit of the present disclosure. Within different time periods, there are different groups of sensing electrodes 52 for sensing. In this embodiment, the sensing circuit 80 can be divided into two groups according to whether sensing is performed in a certain period. The sensing electrodes 52 marked with a grid are electrodes of a first group, and the sensing electrodes 52 not marked with a grid are electrodes of a second group. Within a period of time, the sensing units 60 electrically connected to the sensing electrodes 52 of the first group sense corresponding sensing capacitors $C_f$ coupled to the sensing electrodes 52 of the first group, and the sensing units 60 electrically connected to the sensing electrodes 52 of the second group do not sense corresponding sensing capacitors $C_f$ coupled to the sensing electrodes 52 of the second group. Within the next time period, the sensing units 60 electrically connected to the sensing electrodes 52 of the second group sense corresponding sensing capacitors $C_f$ coupled to the sensing electrodes 52 of the second group, and the sensing units 60 electrically connected to the sensing electrodes 52 of the first group do not sense corresponding sensing capacitors $C_f$ coupled to the sensing electrodes 52 of the first group. In the three states depicted in FIG. 14, the sensing electrodes 52 in the same row arranged along the X direction may be electrodes belonging to the first group or electrodes belonging to the second group, and two adjacent rows of the sensing electrodes 52 may be a row of sensing electrodes 52 of the first group and a row of sensing electrodes 52 of the second group. For example, when the sensing electrodes 52 in the first and third rows are electrodes of the first group, the sensing electrodes 52 in the second and fourth rows are electrodes of the second group. Similarly, when the sensing electrodes 52 in the first and third rows are electrodes of the second group, the sensing electrodes 52 in the second and fourth rows are electrodes of the first group.

Through the above-mentioned driving method, the influence of parasitic capacitor $C_p$ on the voltage level of each sensing wire (e.g., 54A, 54B) would be accurately estimated, and the expected voltage level of each sensing wire (e.g., V01, V02, V03, V04, V05 and V06) would be obtained. Accordingly, whether the sensing electrode 52 coupled to the corresponding signal output line is corresponding to a ridge or a valley of the fingerprint can be determined.

Figure 15:
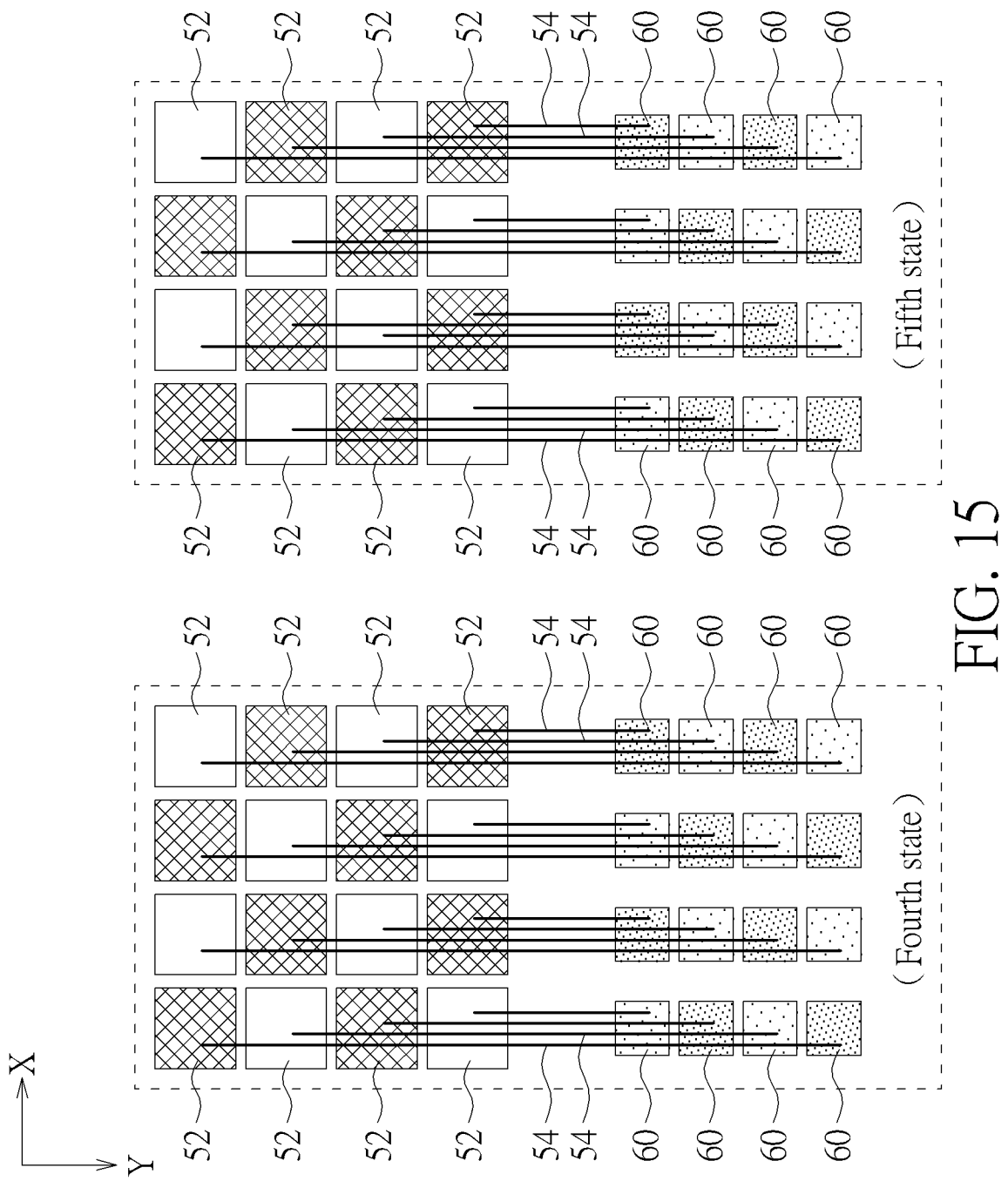
FIG. 15 shows another two states of driving the sensing circuit according to the disclosure.

Please refer to FIG. 15. FIG. 15 shows another two states of driving the sensing circuit 80 according to the present disclosure. Similar to FIG. 14, the sensing electrodes 52 marked with a grid in FIG. 15 are electrodes of the first group, and the sensing electrodes 52 not marked with a grid are electrodes of the second group. The sensing units 60 electrically connected to the electrodes of the first group are the sensing units 60 that sense corresponding sensing capacitors, while the sensing units 60 electrically connected to the electrodes of the second group do not sense corresponding sensing capacitors. As shown in FIG. 15, the four sensing electrodes 52 located on the top, bottom, left, and right of each electrode of the first group are the electrodes of the second group, and the four sensing electrodes located on the top, bottom, left, and right of each electrode of the second group 52 are electrodes of the first group. Through the above-mentioned driving method, the adjacent sensing electrodes 52 are not used for sensing at the same time, so the influence of the parasitic capacitor $C_p$ on the voltage level of each sensing wire can be accurately estimated, and the expected voltage level of each sensing wire would be obtained. Accordingly, whether the sensing electrode 52 coupled to the corresponding signal output line is corresponding to a ridge or a valley of the fingerprint can be determined.

Figure 16:
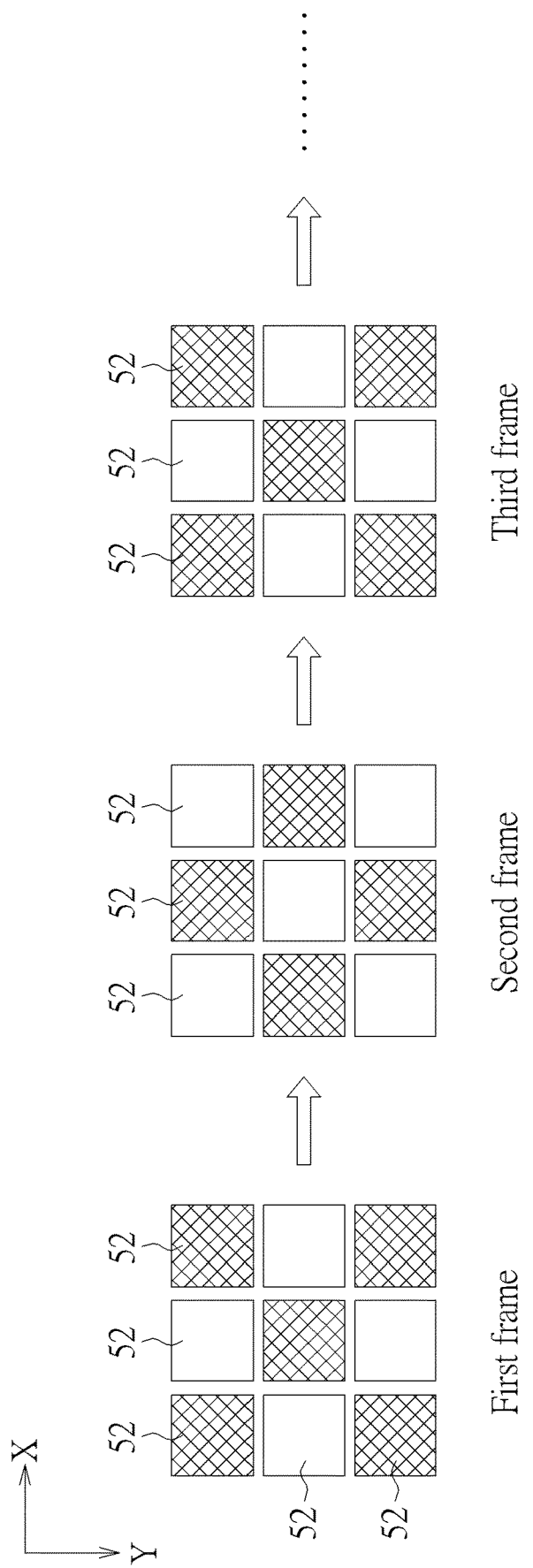
FIG. 16 illustrates the states of a plurality of sensing electrodes in different frames according to an embodiment of the present disclosure.

Please refer to FIG. 16. FIG. 16 illustrates the states of a plurality of sensing electrodes 52 in different frames according to an embodiment of the present disclosure. Similar to FIG. 14, the sensing electrodes 52 marked with a grid in FIG. 16 are electrodes of the first group, and the sensing electrodes 52 not marked with a grid are electrodes of the second group. In this embodiment, in the same frame (i.e., the same time period), electrodes performing sensing belong to the first group, electrodes that do not perform sensing belong to the second group. In every other frame, the electrodes originally belonging to the first group will be switched to be the electrodes belonging to the second group, and the electrodes originally belonging to the second group will be switched to be the electrodes belonging to the first group. In other words, each sensing electrode 52 periodically performs sensing every 2 frames. When a sensing electrode 52 (e.g., an electrode of the first group) performs sensing, four sensing electrodes 52 (e.g., electrodes of the second group) located on the upper, lower, left and right sides of the sensing electrode 52 do not perform sensing. In a $2N^{th}$ frame, the sensing electrodes 52 of the first group perform sensing, while the sensing electrodes 52 of the second group do not perform sensing. In a $(2N+1)^{th}$ frame, the sensing electrodes 52 of the first group perform sensing, while the sensing electrodes 52 of the second group do not perform sensing. N is 0 or a positive integer. The sensing electrodes 52 of the same group are not adjacent to each other. By time-sharing driving, the influence of parasitic capacitor $C_p$ on the voltage level of each sensing wire would be accurately estimated, and the expected voltage level of each sensing wire would be obtained. Accordingly, whether the sensing electrode 52 coupled to the corresponding signal output line is corresponding to a ridge or a valley of the fingerprint can be determined.

Figure 17:
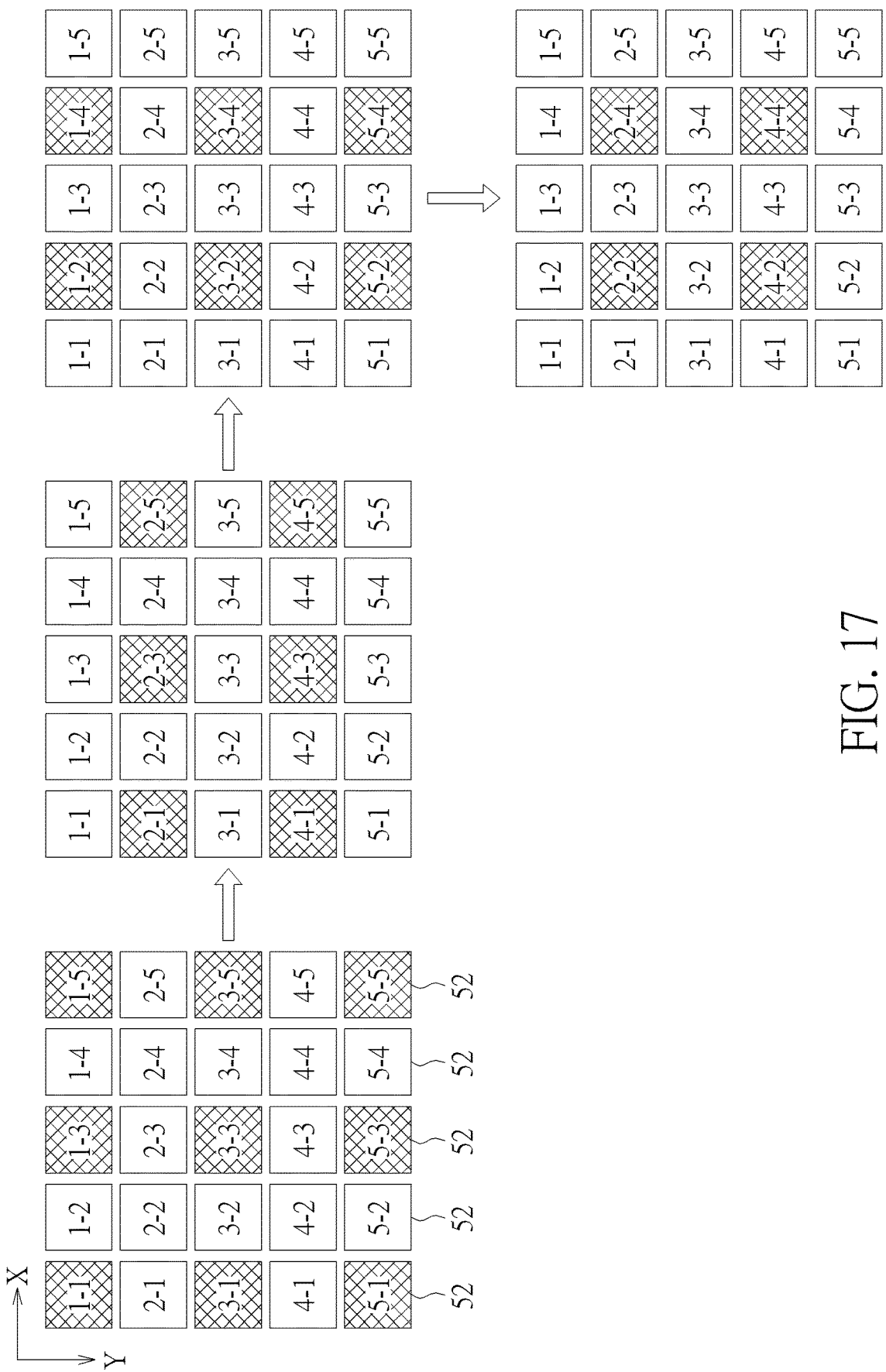
FIG. 17 illustrates the states of a plurality of sensing electrodes in different frames according to another embodiment of the disclosure.

In the embodiment of FIG. 17, each sensing electrode 52 periodically performs sensing every 4 frames. When a sensing electrode 52 (i.e., an electrode of the first group) performs sensing, the surrounding sensing electrodes (i.e., electrodes of the second group) do not perform sensing. For example, when the sensing electrode 1-1 performs sensing, the sensing electrodes 1-2, 2-1, and 2-2 do not perform sensing. When the sensing electrode 3-1 performs sensing, the sensing electrodes 2-1, 2-2, 3-2, 4-1, and 4-2 do not perform sensing. When the sensing electrode 3-3 performs sensing, the sensing electrodes 2-2, 2-3, 2-4, 3-2, 3-4, 4-2, 4-3, and 4-4 do not perform sensing. In a $4N^{th}$ frame, the sensing electrodes 52 of the first group perform sensing. For example, the sensing electrodes 1-1, 1-3, 1-5, 3-1, 3-3, 3-5, 5-1, 5-3 and 5-5 perform sensing, while the sensing electrodes 52 of the second group arranged around the sensing electrodes 52 of the first group do not perform sensing. When in a $(4N+1)^{th}$ frame, the sensing electrodes 52 of the first group perform sensing. For example, the sensing electrodes 2-1, 2-3, 2-5, 4-1, 4-3, and 4-5 perform sensing, and the sensing electrodes 52 of the second group disposed around the sensing electrodes 52 of the first group do not perform sensing. When in a $(4N+2)^{th}$ frame, the sensing electrodes 52 of the first group perform sensing. For example, sensing electrodes 1-2, 1-4, 3-2, 3-4, 5-2, and 5-4 perform sensing, and the sensing electrodes 52 of the second group arranged around the sensing electrodes 52 of the first group do not perform sensing. When in a $(4N+3)^{th}$ frame, the sensing electrodes 52 of the first group perform sensing. For example, the sensing electrodes 2-2, 2-4, 4-2, and 4-4 perform sensing, and the sensing electrodes 52 of the second group arranged around the sensing electrodes 52 of the first group do not perform sensing. N is 0 or a positive integer.

Figure 18:
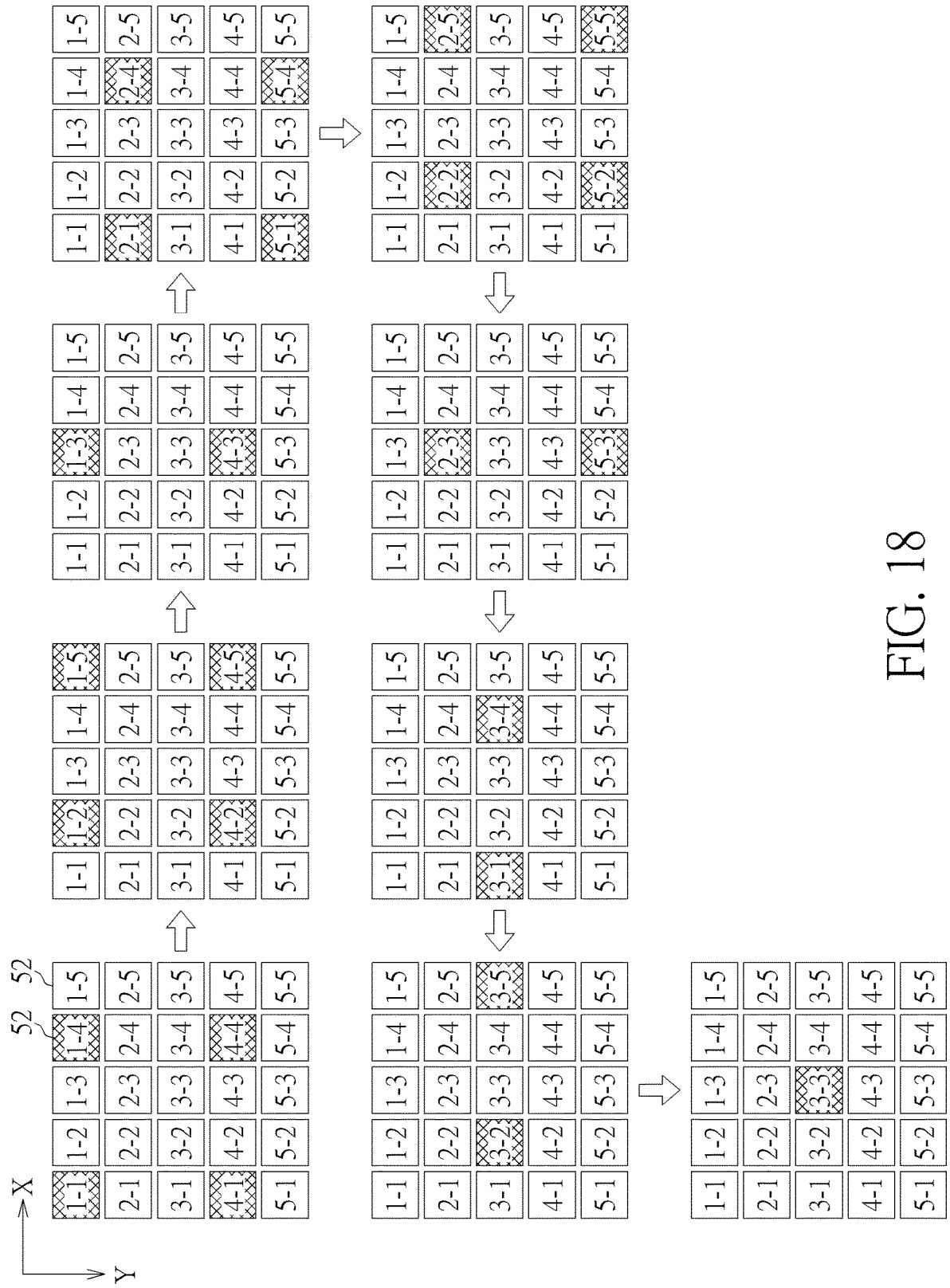
FIG. 18 illustrates the states of a plurality of sensing electrodes in different frames according to another embodiment of the disclosure.

In the embodiment of FIG. 18, each sensing electrode 52 periodically performs sensing every 9 frames. When a sensing electrode 52 (i.e, an electrode of the first group) performs sensing, two consecutive sensing electrodes (i.e., electrodes of the second group) adjacent to the sensing electrode 52 of the first group do not perform sensing. For example, when the sensing electrode 1-1 performs sensing, the sensing electrodes 1-2, 1-3, 2-1 and 3-1 does not perform sensing. When the sensing electrode 1-2 performs sensing, the sensing electrodes 1-1, 1-3, 1-4, 2-2, and 3-2 do not perform sensing. When the sensing electrode 3-3 performs sensing, the sensing electrodes 1-3, 2-3, 4-3, 5-3, 3-1, 3-2, 3-4, and 3-5 do not perform sensing. In a $9N^{th}$ frame, the sensing electrodes 52 of the first group perform sensing. For example, the sensing electrodes 1-1, 1-4, 4-1, and 4-4 perform sensing, and sensing electrodes 52 of the second group arranged around the sensing electrodes 52 of the first group do not perform sensing. When in a $(9N+1)^{th}$ frame, the sensing electrodes 52 of the first group perform sensing. For example, the sensing electrodes 1-2, 1-5, 4-2, and 4-5 perform sensing, and the sensing electrodes 52 of the second group do not perform sensing. When in a $(9N+2)^{th}$ frame, the sensing electrodes 52 of the first group perform sensing. For example, the sensing electrodes 1-3 and 4-3 perform sensing, and the sensing electrodes 52 of the second group do not perform sensing. When in a $(9N+3)^{th}$ frame, the sensing electrodes 52 of the first group perform sensing. For example, the sensing electrodes 2-1, 2-4, 5-1, and 5-4 perform sensing, and the sensing electrodes 52 of the second group do not perform sensing. When in a $(9N+4)^{th}$ frame, the sensing electrodes 52 of the first group perform sensing. For example, the sensing electrodes 2-2, 2-5, 5-2, and 5-5 perform sensing, and the sensing electrodes 52 of the second group do not perform sensing. When in a $(9N+5)^{th}$ frame, the sensing electrodes 52 of the first group perform sensing. For example, the sensing electrodes 2-3 and 5-3 perform sensing, and the sensing electrodes 52 of the second group do not perform sensing. When in a $(9N+6)^{th}$ frame, the sensing electrodes 52 of the first group perform sensing. For example, the sensing electrodes 3-1 and 3-4 perform sensing, and the sensing electrodes 52 of the second group do not perform sensing. When in a $(9N+7)^{th}$ frame, the sensing electrodes 52 of the first group perform sensing. For example, the sensing electrodes 3-2 and 3-5 perform sensing, and the sensing electrodes 52 of the second group do not perform sensing. When in a $(9N+8)^{th}$ frame, the sensing electrodes 52 of the first group perform sensing. For example, the sensing electrode 3-3 performs sensing, and the sensing electrodes 52 of the second group do not perform sensing. N is 0 or a positive integer.

Through the methods of operating the sensing circuit described in the embodiments of the present disclosure, the influence of parasitic capacitors between the sensing wires on the sensing accuracy of the sensing circuit could be reduced even when the resolution of the sensing circuit becomes higher and higher.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of operating a sensing circuit, the sensing circuit comprising a plurality of sensing units and a plurality of sensing electrodes, the sensing electrodes being divided into a first group and a second group, the method comprising:

providing a first sensing signal to the sensing electrodes of the first group in a first time period, wherein the sensing electrodes of the first group are electrically connected to a portion of the sensing units; and providing a second sensing signal to the sensing electrodes of the second group in a second time period, wherein the sensing electrodes of the second group are electrically connected to another portion of the sensing units;

wherein the first time period and the second time period starts at different times and are not overlapped with each other; and wherein the sensing units are arranged in M rows and N columns, M and N are integers greater than 1.

2. The method of claim 1, wherein the sensing electrodes of the first group are adjacent to the sensing electrodes of the second group.

3. The method of claim 1, wherein the sensing electrodes of the first group and the sensing electrodes of the second group are in different rows respectively.

4. The method of claim 1, wherein the sensing electrodes of the first group are not adjacent to each other.

5. The method of claim 1, further comprising:
providing a reference signal to the sensing electrodes of the second group in the first time period.

6. The method of claim 1, further comprising:
providing a reference signal to the sensing electrodes of the first group in the second time period.

7. The method of claim 1, wherein each of the sensing electrodes periodically performs sensing every 2 frames.

8. The method of claim 1, wherein each of the sensing electrodes periodically performs sensing every 4 frames.

9. The method of claim 1, wherein each of the sensing electrodes periodically performs sensing every 9 frames.

10. The method of claim 1, wherein the sensing electrodes are arranged in M rows and N columns.

11. The method of claim 1, wherein each of the sensing electrodes is connected to a corresponding sensing unit through a corresponding sensing wire.

12. The method of claim 1, wherein the sensing units output corresponding signals according to capacitances between the sensing electrodes and a finger.

* * * * *